United States Patent
Micu et al.

(10) Patent No.: US 7,478,616 B2
(45) Date of Patent: Jan. 20, 2009

(54) CONDUIT ENCLOSURE SYSTEM FOR ENCLOSING AN ENGINE WIRING HARNESS

(75) Inventors: Carl John Micu, Cedar Falls, IA (US); Curtis Paul Ritter, Waterloo, IA (US); Richard Hartley Coe Holden, Palmdale, CA (US); Dennis William Northon, Shadow Hills, CA (US); Wade Sanner Carpenter, Jonesboro, AR (US)

(73) Assignee: Deere & Company, Moline, IL (US)

( * ) Notice: Subject to any disclaimer, the term of this patent is extended or adjusted under 35 U.S.C. 154(b) by 2 days.

(21) Appl. No.: 11/602,602

(22) Filed: Nov. 21, 2006

(65) Prior Publication Data

US 2008/0115969 A1    May 22, 2008

(51) Int. Cl.
*H01T 13/56* (2006.01)
*F02P 7/02* (2006.01)
*H01J 1/52* (2006.01)
*H02G 3/06* (2006.01)

(52) U.S. Cl. ............ 123/143 C; 123/633; 315/85; 174/72 A (58) Field of Classification Search ............. 123/143 C, 123/633; 174/397, 72 A; 315/85
See application file for complete search history.

(56) References Cited

U.S. PATENT DOCUMENTS

| | | | | |
|---|---|---|---|---|
| 1,330,811 A | * | 2/1920 | Konigslow, Sr. | 123/143 C |
| 2,105,790 A | * | 1/1938 | Mascuch | 123/633 |
| 2,105,791 A | * | 1/1938 | Mascuch | 123/633 |
| 2,134,946 A | * | 11/1938 | Hurley | 123/633 |
| 2,173,539 A | * | 9/1939 | Peters et al. | 123/633 |
| 2,194,888 A | * | 3/1940 | De La Tramerye | 123/633 |
| 2,213,478 A | * | 9/1940 | Swanson | 123/143 C |
| 2,234,579 A | * | 3/1941 | Robertson | 123/143 C |
| 2,240,526 A | * | 5/1941 | Harry | 123/633 |
| 2,291,051 A | * | 7/1942 | Mascuch | 123/633 |
| 2,299,714 A | * | 10/1942 | Spengler | 123/633 |
| 2,316,504 A | * | 4/1943 | Dayton | 123/633 |
| 2,322,903 A | * | 6/1943 | Wilkoff | 123/633 |
| 2,342,768 A | * | 2/1944 | Emmons et al. | 123/633 |
| 2,350,367 A | * | 6/1944 | Peters et al. | 123/633 |
| 2,402,049 A | * | 6/1946 | Ingalls | 123/633 |
| 2,414,000 A | * | 1/1947 | Spengler | 123/633 |
| 5,105,054 A | * | 4/1992 | Kirma | 174/72 A |

(Continued)

OTHER PUBLICATIONS

Glenair; Series 74 Convoluted Tubing; catalog, www.glenair.com; 2003; pp. D-14, D-15, D-16, D-18 and D-29; Glenair, Inc.; Glendale, CA.

*Primary Examiner*—Willis R Wolfe, Jr.

(57) ABSTRACT

A conduit enclosure system for enclosing an engine wiring harness includes a conduit manifold configured to removably enclose a manifold portion of the engine wiring harness, the conduit manifold having a manifold outlet for each corresponding harness branch of a plurality of harness branches of the engine wiring harness. The conduit enclosure system also includes a conduit branch for each corresponding harness branch, the conduit branch being configured to removably lengthwise enclose each corresponding harness branch. The conduit branch has a first branch end and a second branch end, the first branch end being coupled to a corresponding manifold outlet, and the second branch end being coupled to the exposed portion of a corresponding control component of the plurality of control components in sealing engagement for sealing the exposed portion.

30 Claims, 6 Drawing Sheets

U.S. PATENT DOCUMENTS 6,457,466 B1 10/2002 Ritter et al.
6,898,512 B1 5/2005 Ritter et al.
7,072,261 B2 7/2006 Cheng et al.

* cited by examiner

CONDUIT ENCLOSURE SYSTEM FOR ENCLOSING AN ENGINE WIRING HARNESS

FIELD OF THE INVENTION

The present invention relates to engines, and more particularly, to a conduit enclosure system for enclosing an engine wiring harness.

BACKGROUND OF THE INVENTION

Engines of many types are employed in a variety of applications, such as transportation and power generation. Such engines are typically controlled electronically, and employ various control components that are used to operate the engine, such as fuel injectors, crankcase ventilation valves, and engine monitoring sensors, which are electrically connected to an electronic control unit by a wiring harness. In some applications, the engine may be located in a potentially problematic environment, such as one containing contaminants and/or possibly flammable gas or vapor mixtures. In such environments, it is desirable to prevent the harness from being exposed to the environment in order to prevent damage to the wired connections to the control components, and to reduce the likelihood of an explosion being caused by an inadvertent spark in the wiring harness or at the electrical connections between the wiring harness and the control components, for example, due to a build up of dust or other debris causing a short circuit at the electrical connections. Various government regulations may require that the engine be certified in order to operate in such environments. However, typical wiring harnesses may not meet the certification requirements.

SUMMARY OF THE INVENTION

The present invention provides a conduit enclosure system for enclosing an engine wiring harness and its connections to the control components.

The invention, in one form thereof, is directed to a conduit enclosure system for enclosing an engine wiring harness. The engine wiring harness has a manifold portion and a plurality of harness branches extending therefrom. The plurality of harness branches couple a plurality of control components to a control unit. Each control component of the plurality of control components has an exposed portion for electrical connection to the control unit via the engine wiring harness. The conduit enclosure system includes a conduit manifold configured to removably enclose the manifold portion, the conduit manifold having a manifold outlet for each corresponding harness branch of the plurality of harness branches of the engine wiring harness. The conduit enclosure system also includes a conduit branch for each corresponding harness branch, the conduit branch being configured to removably lengthwise enclose each corresponding harness branch. The conduit branch has a first branch end and a second branch end, the first branch end being coupled to a corresponding manifold outlet, and the second branch end being coupled to the exposed portion of a corresponding control component of the plurality of control components in sealing engagement for sealing the exposed portion.

The present invention, in another form thereof, is directed to an engine. The engine includes a control unit; a plurality of control components, each control component of the plurality of control components having an exposed portion for electrical connection with the control unit; an engine wiring harness having a manifold portion and a plurality of harness branches extending therefrom, the plurality of harness branches electrically coupling the plurality of control components to the control unit via the exposed portion; and a conduit enclosure system for enclosing the engine wiring harness. The conduit enclosure system includes a conduit manifold configured to removably enclose the manifold portion, the conduit manifold having a manifold outlet for each corresponding harness branch of the plurality of harness branches of the engine wiring harness. The conduit enclosure system also includes a conduit branch for each corresponding harness branch, the conduit branch being configured to removably lengthwise enclose each corresponding harness branch. The conduit branch has a first branch end and a second branch end, the first branch end being coupled to a corresponding manifold outlet, and the second branch end being coupled to the exposed portion of a corresponding control component of the plurality of control components in sealing engagement for sealing the exposed portion.

DETAILED DESCRIPTION OF THE INVENTION

Figure 1:
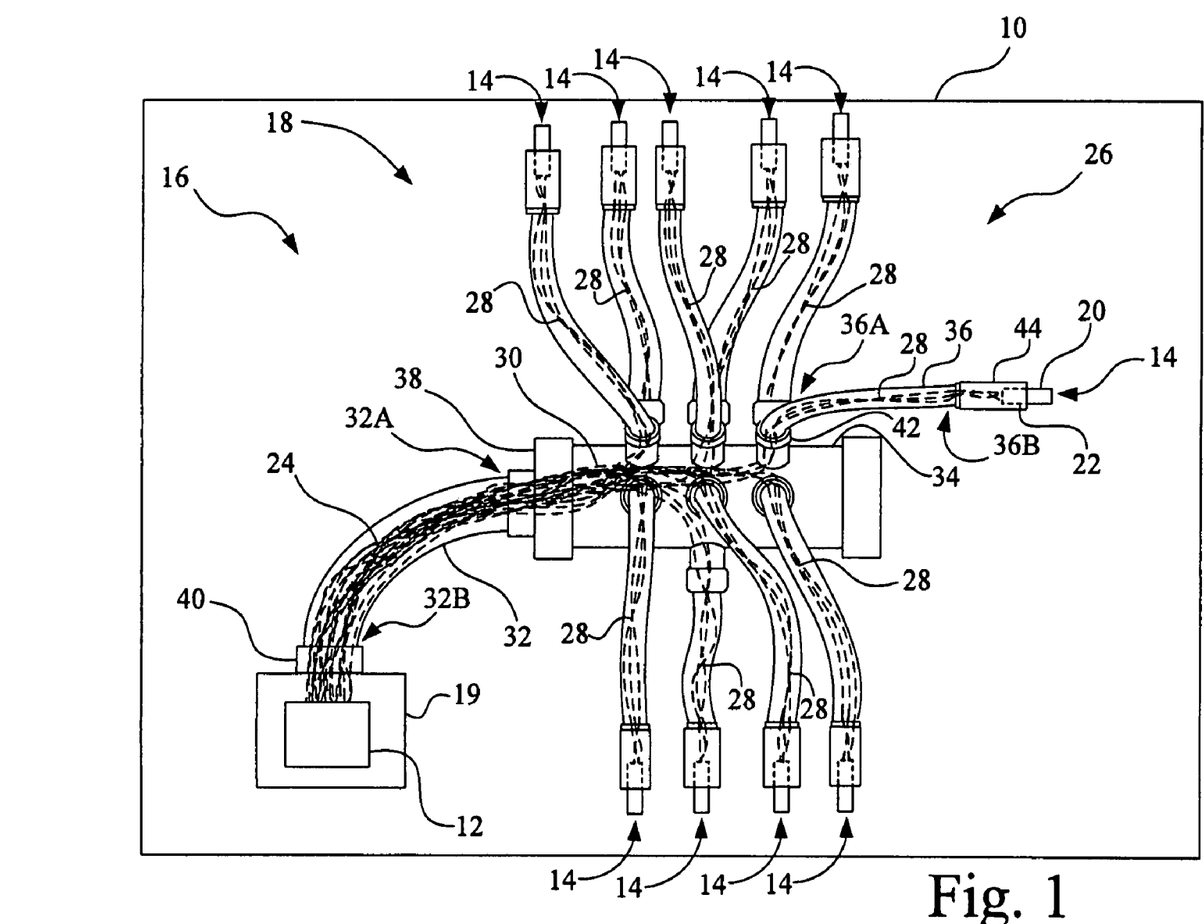
FIG. 1 schematically depicts an engine with an engine wiring harness and a conduit enclosure system in accordance with an embodiment of the present invention.

Referring now to FIG. 1, there is shown an engine 10. Engine 10 may be, for example, an internal combustion engine or a gas turbine engine. In the present embodiment, engine 10 is an internal combustion engine. Engine 10 includes a control unit 12, a plurality of control components 14, an engine wiring harness 16, and a conduit enclosure system 18 for enclosing wiring harness 16.

Control unit 12 is an electronic control unit that governs the operation of engine 10 by sending and receiving electrical signals to and from control components 14 via wiring harness 16. In the present embodiment, control unit 12 resides in an enclosure 19 that seals control unit 12 from the ambient environment in the vicinity of engine 10. Enclosure 19 may be mounted on engine 10 or at a location remote from engine 10.

Control components 14 are electronic engine components of a type typically used in the operation and control of an engine, such as engine 10, and include, for example, fuel injectors, a crankcase ventilation valve, an air temperature sensor, a fuel temperature sensor, a fuel cam sensor, a fuel rail pressure sensor, a crank position sensor, a coolant temperature sensor, and an oil pressure sensor. In accordance with the present embodiment, control components 14 are conventional components, i.e., not specifically manufactured for use in conjunction with conduit enclosure system 18. Rather, in the present embodiment, conduit enclosure system 18 is adapted for use with conventional control components. Each control component 14 includes a control portion 20 that is installed into engine 10 or a subsystem thereof, and an exposed portion 22. For example, in the case of a fuel temperature sensor, control portion 20 pertains to that end of the fuel temperature sensor that is exposed to fuel being delivered to engine 10, whereas exposed portion 22 is that end of the fuel temperature sensor that externally protrudes from engine 10 for electrical connection to control unit 12 via wiring harness 16.

Wiring harness 16 includes a harness trunk 24, a manifold portion 26, and a plurality of harness branches 28. Harness trunk 24 extends between manifold portion 26 and control unit 12. Harness branches 28 extend from manifold portion 26 to distribute wiring 30 to control components 14 for the operation thereof. At the end of each harness branch 28 are electrical connectors (not shown) for electrically connecting the corresponding control component 14 to wiring 30 via mating electrical connectors (not shown) on control component 14.

Conduit enclosure system 18 includes a conduit trunk 32, a conduit manifold 34, a conduit branch 36 for each corresponding harness branch 28 of wiring harness 16, and a plurality of adapters, including adapter 38, adapter 40, adapters 42, and adapters 44. Adapters 38 and 40 are for coupling conduit trunk 32 with conduit manifold 34 and enclosure 19, respectively. Adapters 42 and 44 are employed for coupling each conduit branch 36 to conduit manifold 34 and the corresponding control component 14, respectively. Conduit trunk 32 and conduit branches 36 are made of a flexible material to allow for easy routing and installation. In addition, each of conduit trunk 32 and conduit branches 36 are collapsible to a sufficient degree for retraction to allow the ends of each harness branch 28 and harness trunk 24 contained therein to expose the electrical connectors. In the present embodiment, conduit trunk 32 and conduit branches 36 are made from DuPont Teflon® PFA C-980 static dissipating semi-conductive resin, formed into a convoluted conduit, that is, a conduit having thread-like convolutions.

Each conduit branch 36 is configured to removably lengthwise enclose a corresponding harness branch 28, and has a branch end 36A and a branch end 36B. That is, although each conduit branch 36 encloses a harness branch 28, harness branch 28 is readily removable from conduit branch 36 to allow disassembly and/or repair of wiring harness 16, without causing damage to harness branch 28 or conduit branch 36.

Conduit trunk 32 is configured to removably lengthwise enclose harness trunk 24. That is, although conduit trunk 32 encloses harness trunk 24, harness trunk 24 is readily removable from conduit trunk 32 to allow disassembly and/or repair of wiring harness 16, without causing damage to harness trunk 24 or conduit trunk 32. Conduit trunk 32 has a trunk end 32A coupled to conduit manifold 34 in sealing engagement for sealing the contents of conduit manifold 34, thus preventing debris from affecting manifold portion 26, and reducing the likelihood that an inadvertent spark generated in wiring harness 16 will ignite any combustible gases in the vicinity of engine 10. Trunk end 32B of conduit trunk 32 is coupled to enclosure 19 in sealing engagement. Accordingly, harness trunk 24 is not exposed to the ambient environment of engine 10.

Conduit manifold 34 is configured to removably enclose manifold portion 26 of wiring harness 16. That is, conduit manifold 34 encloses manifold portion 26, although manifold portion 26 is not permanently enclosed by conduit manifold 34, but rather, is readily removable from conduit manifold to allow disassembly and/or repair of wiring harness 16, without causing damage to manifold portion 26 or conduit manifold 34.

Figure 2A:
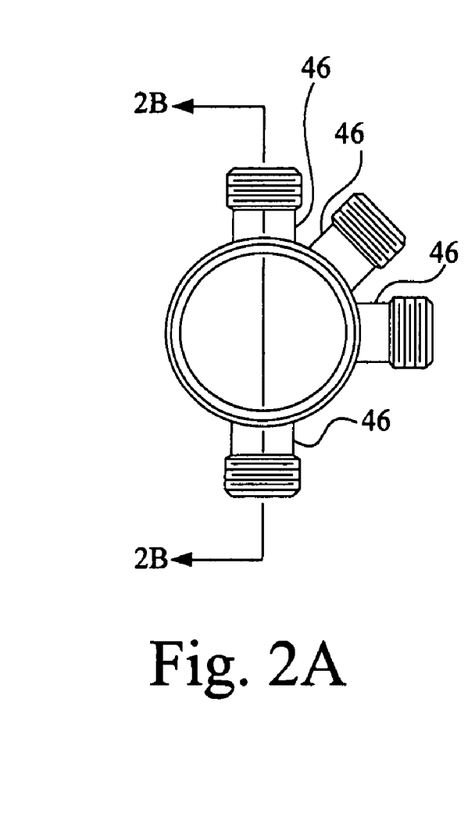
FIGS. 2A-2C depicts a conduit manifold employed by the conduit enclosure system embodiment of FIG. 1.
Figure 2B:
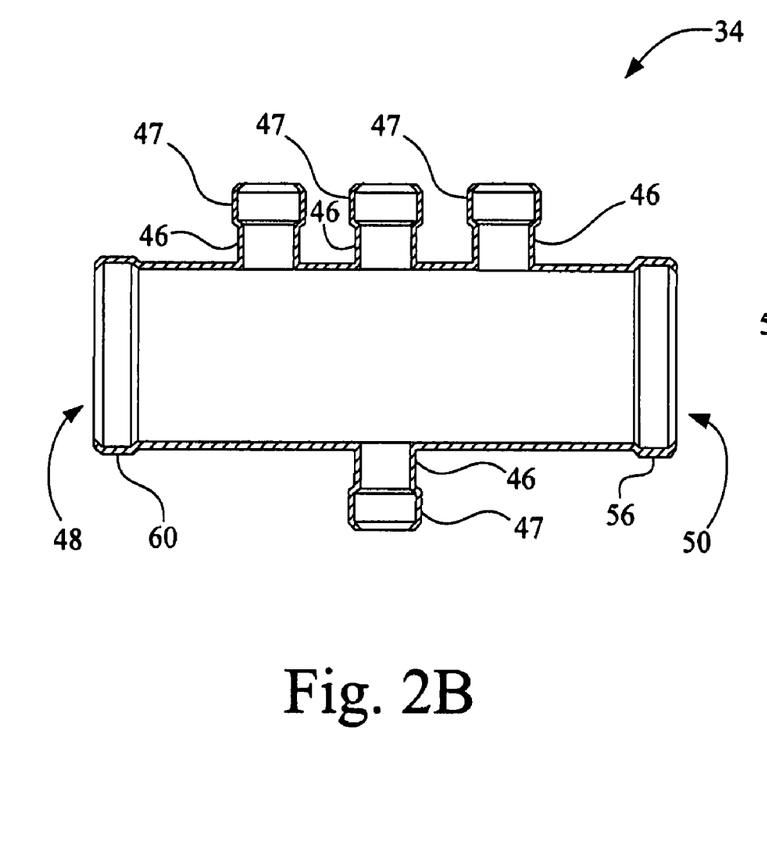
Figure 2C:
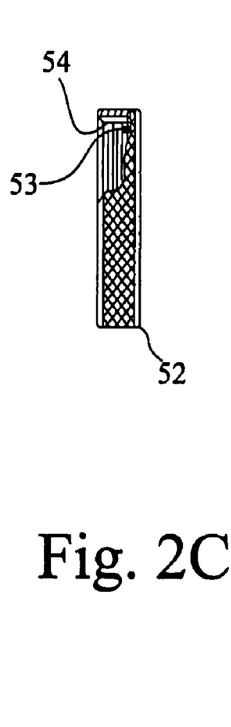

Referring now to FIGS. 2A-2C, conduit manifold 34 has a manifold outlet 46 for each corresponding harness branch 28 that extends from manifold portion 26 of wiring harness 16. Each manifold outlet has threads 47 for connecting it's corresponding conduit branch. For each harness branch 28, branch end 36A of the conduit branch 36 is coupled to a corresponding manifold outlet 46, whereas branch end 36B is coupled to exposed portion 22 of a corresponding control component 14 in sealing engagement for sealing exposed portion 22, thus preventing debris from affecting the exposed portion 22, and reducing the likelihood that an inadvertent spark generated at the electrical connection of harness branch 28 to control component 14 will ignite any combustible gases in the vicinity of engine 10.

Conduit manifold 34 has an opening at each end, i.e., opening 48 and opening 50, which provide access to install harness branches 28 and manifold portion 26. Once installed, an end cap 52 having an o-ring seal 53 and threads 54 is screwed onto threads 56 of conduit manifold 34 adjacent opening 50 to seal that side of conduit manifold 34.

Figure 3:
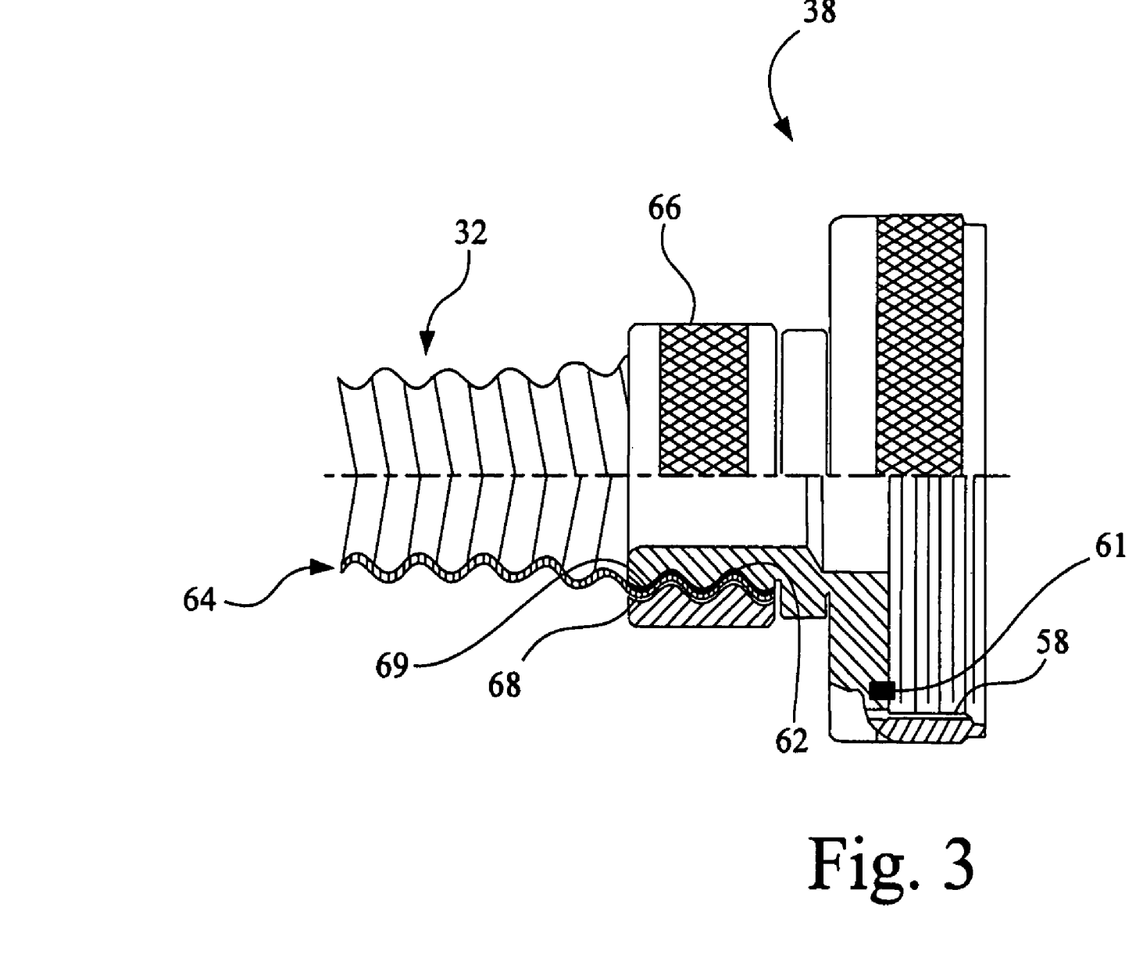
FIG. 3 depicts an adapter used in accordance with the embodiment of FIG. 1 to connect and seal a trunk conduit with a conduit manifold.

Referring now to FIG. 3, adapter 38 is depicted in greater detail in a partial cross-section. Adapter 38 is configured to connect and seal conduit trunk 32 with conduit manifold 34 at opening 48. In the present embodiment, adapter 38 includes threads 58 that are engaged with threads 60 on conduit manifold 34 adjacent opening 48, which allow adapter 38 to be removably connected to conduit manifold 34, that is connected to conduit manifold 34 in such manner that does not require destruction of any components of wiring harness 16 and/or conduit enclosure system 18 in order to disconnect adapter 38 from conduit manifold 34. An o-ring 61 seals adapter 38 against conduit manifold 34. For servicing wiring harness 16, adapter 38 may be unscrewed from conduit manifold 34, hence allowing the removal of manifold portion 26 and harness branches 28.

Adapter 38 is also configured for removable engagement with conduit trunk 32, which allows adapter 38 to be securely connected to, but readily removed from conduit trunk 32 without damaging any components of wiring harness 16 and/or conduit enclosure system 18 in order to disconnect adapter 38 from conduit trunk 32. Accordingly, in the present embodiment, adapter 38 includes thread-like convolutions 62 that correspond to the convolutions 64 of conduit trunk 32. A nut fitting 66 having thread-like convolutions 68 also corresponding to convolutions 64 of conduit trunk 32 is used to attach conduit trunk 32 to adapter 38. A sealant 69, such as a silicon sealant, is added between convolutions 62 and convolutions 64. Conduit trunk 32 is secured and sealed to adapter 38 by threading nut fitting 66 several turns onto conduit trunk 32 in the direction away from adapter 38, applying sealant 69 to convolutions 62 of adapter 38, screwing conduit trunk 32 onto convolutions 62, and screwing nut fitting 66 securely into place, e.g., abutting adapter 38.

Convolutions 62 of adapter 38 have a larger diameter than convolutions 64 of conduit trunk 32, causing a diametral interference between conduit trunk 32 and adapter 38 when conduit trunk 32 is threaded onto adapter 38, which provides sealing as between conduit trunk 32 and adapter 38. Convolutions 68 of nut fitting 66 are sized to retain conduit trunk 32 in place on adapter 38.

Adapter 40 couples trunk end 32B to enclosure 19 in a manner similar to that of adapter 38.

Figure 4:
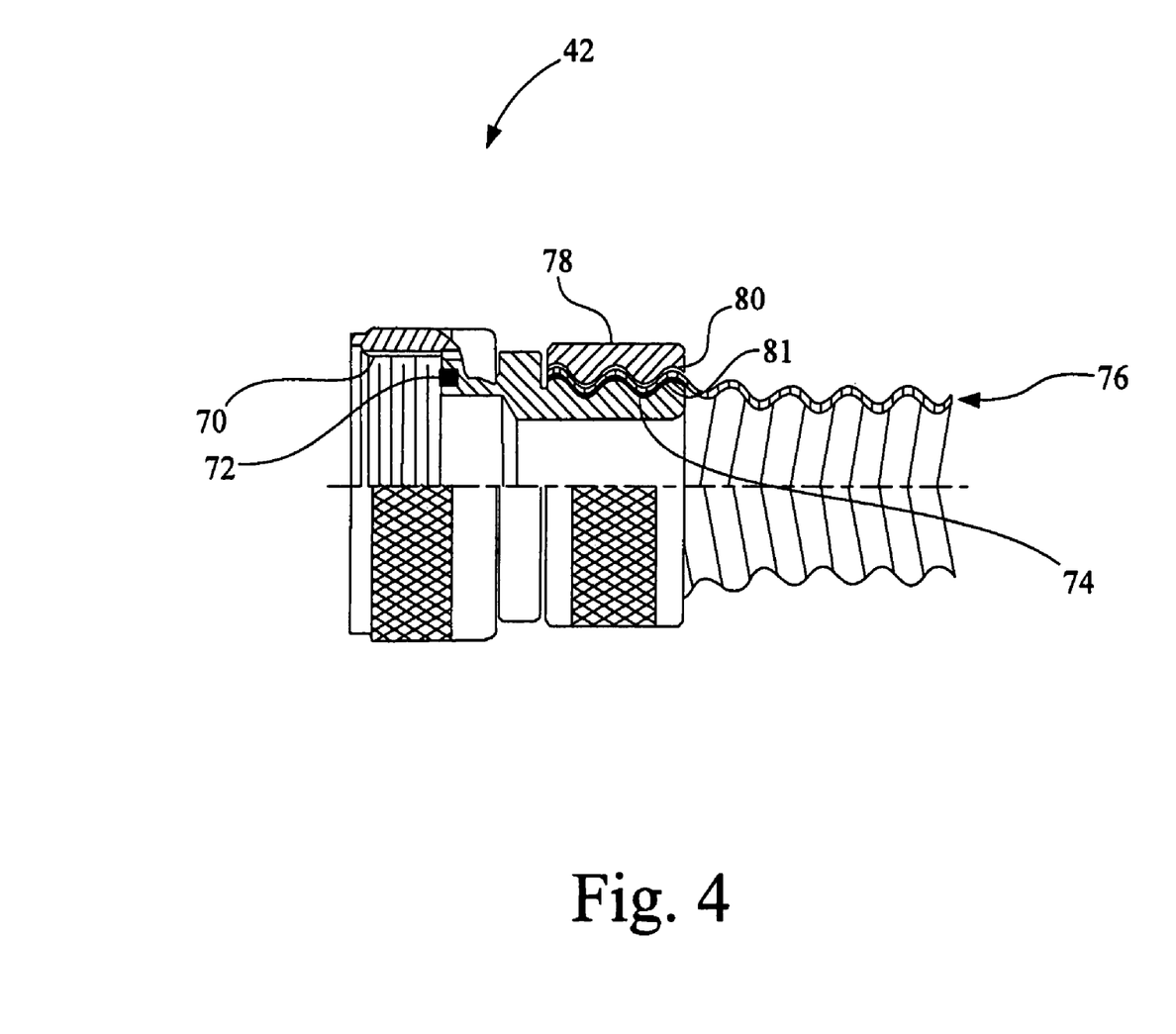
FIG. 4 depicts an adapter used in accordance with the embodiment of FIG. 1 to connect and seal a conduit branch with a manifold outlet.

Referring now to FIG. 4, adapter 42 is depicted in greater detail in a partial cross-section. An adapter 42 is configured to connect and seal conduit branch 36 with manifold outlet 46 for each corresponding harness branch 28 of wiring harness 16. In the present embodiment, adapter 42 includes threads 70 that are engaged with threads 47 on conduit manifold 34 for each manifold outlet 46, which allow adapter 42 to be removably connected to manifold outlet 46, that is connected to manifold outlet 46 in such manner that does not require destruction of any components of wiring harness 16 and/or conduit enclosure system 18 in order to disconnect adapter 42 from manifold outlet 46. An o-ring 72 seals adapter 42 against manifold outlet 46. For servicing wiring harness 16, adapter 42 may be unscrewed to expose the corresponding harness branch 28.

Adapter 42 is also configured for removable engagement with conduit branch 36, which allows adapter 42 to be securely connected to, but readily removed from conduit branch 36 without damaging any components of wiring harness 16 and/or conduit enclosure system 18 in order to disconnect adapter 42 from conduit branch 36. Accordingly, in the present embodiment, adapter 42 includes thread-like convolutions 74 that correspond to the convolutions 76 of conduit branch 36. A nut fitting 78 having thread-like convolutions 80 also corresponding to convolutions 76 of conduit branch 36 is used to attach conduit branch 36 to adapter 42. A sealant 81, such as a silicon sealant, is added between 74 convolutions and 76 convolutions. Conduit branch 36 is secured and sealed to adapter 42 by threading nut fitting 78 several turns onto conduit branch 36 in the direction away from adapter 42, applying sealant 81 to convolutions 74 of adapter 42, screwing conduit branch 36 onto convolutions 74, and screwing nut fitting 78 securely into place, e.g., abutting adapter 42.

Convolutions 74 of adapter 42 have a larger diameter than convolutions 76 of conduit branch 36, causing a diametral interference between conduit branch 36 and adapter 42 when conduit branch 36 is threaded onto adapter 42, which provides sealing as between conduit branch 36 and adapter 42. Convolutions 80 of nut fitting 78 are sized to retain conduit branch 36 in place on adapter 42.

Adapter 44 is configured to connect and seal conduit branch 36 with the corresponding control component 14, i.e., the control component 14 associated with the harness branch 28 that is enclosed by the particular conduit branch 36. Adapter 44 is configured to removably connect to control component 14, e.g., so as to allow for replacement of wiring harness 16, harness branch 28, and/or control component 14 without damage to wiring harness 16, harness branch 28, and/or control component 14. The structure of adapter 44 is adapted to the particular control component 14, and may be a different size and/or employ different features, depending on the particular control component 14. Adapter 44 is also configured for removable engagement with conduit branch 36, for example, in the same manner described above with respect to adapter 42.

Figure 5:
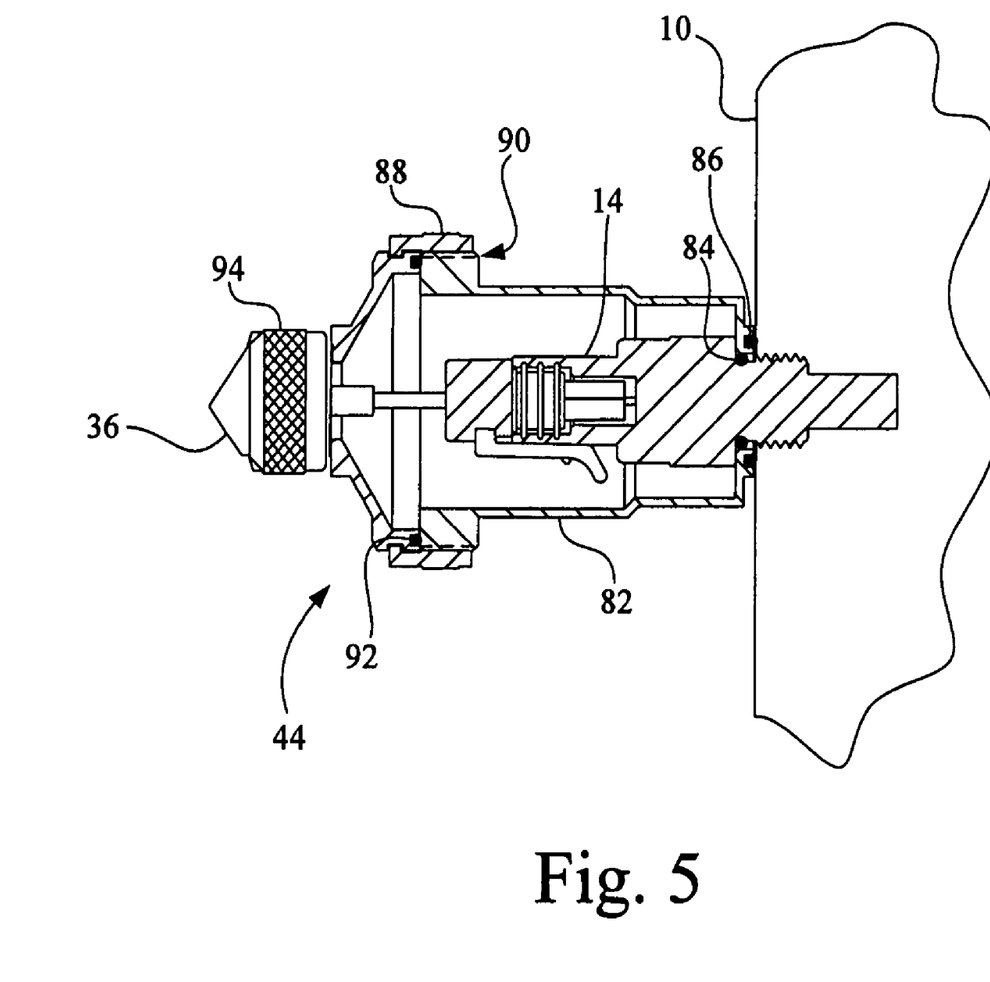
FIG. 5 depicts an adapter used in accordance with the embodiment of FIG. 1 to connect and seal a conduit branch with a control component, such as an engine temperature sensor.

Referring now to FIG. 5, an embodiment of an adapter 44 in accordance with the present invention is depicted. Conduit enclosure system 18 includes a receptacle 82 for receiving therein and sealing exposed portion 22 of the corresponding control component 14, which in the example of FIG. 5 is a fuel temperature sensor. Sealing between receptacle 82 and control component 14 is provided by an o-ring 84, whereas sealing between receptacle 82 and engine 10 is provided by an o-ring 86.

Adapter 44 includes a threaded ring 88 which mates with threads 90 on the periphery of receptacle 82 for securing adapter 44 to receptacle 82, hence, control component 14. Adapter 44 is sealed against receptacle 82 via an o-ring 92. A nut fitting 94 is used to secure and seal conduit branch 36 to adapter 44 in the same manner as set forth above with respect to nut fitting 78 and adapter 42.

Figure 6:
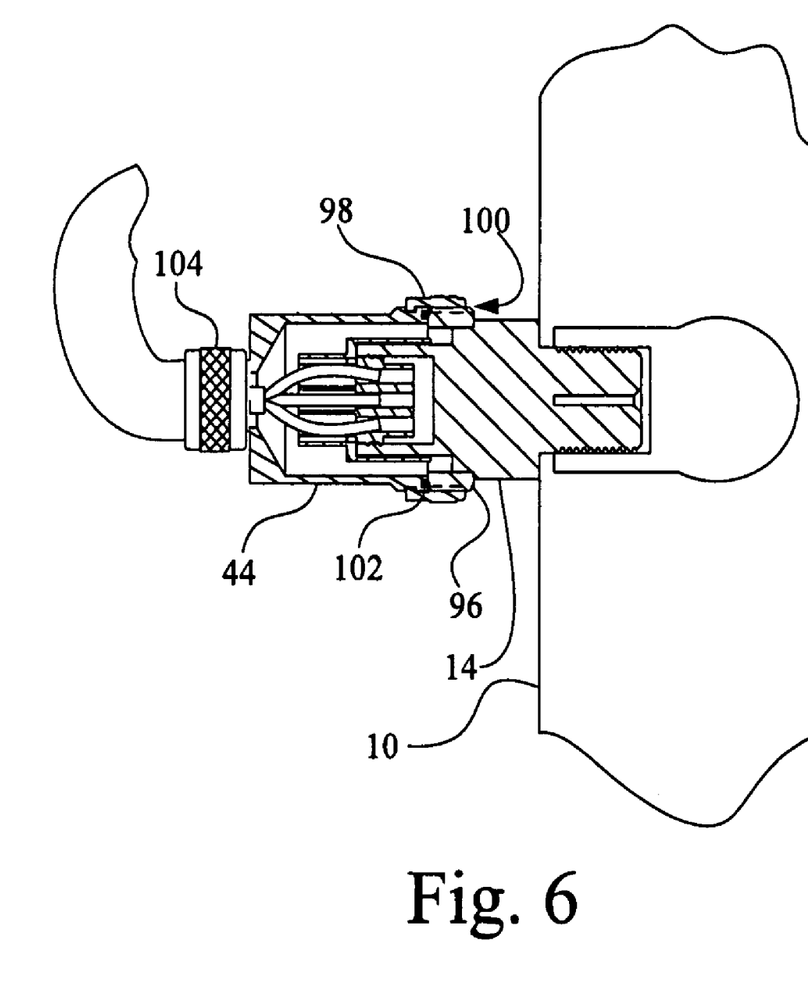
FIG. 6 depicts an adapter used in accordance with the embodiment of FIG. 1 to connect and seal a conduit branch with a control component, such as an engine pressure sensor.

Referring now to FIG. 6, another embodiment of an adapter 44 in accordance with the present invention is depicted. Conduit enclosure system 18 includes a coupling ring 96 that is affixed to control component 14, which in the example of FIG. 6 is a fuel rail pressure sensor. In the present embodiment, coupling ring 96 is affixed to control component 14 using a conventional epoxy, which provides sealing as between coupling ring 96 and control component 14. Coupling ring 96 is configured for connection with adapter 44.

Adapter 44 includes a threaded ring 98 which mates with threads 100 on the periphery of coupling ring 96 for securing adapter 44 to coupling ring 96, hence, control component 14. Adapter 44 is sealed against coupling ring 96 via an o-ring 102. A nut fitting 104 is used to secure and seal conduit branch 36 to adapter 44 in the same manner as set forth above with respect to nut fitting 78 and adapter 42.

By virtue of the present invention, it will be understood that wiring harness 16 is completely enclosed by conduit enclosure system 18, and is sealed as against the ambient environment surrounding engine 10 by conduit enclosure system 18, thus isolating wiring harness 16 from dust and other debris and thereby preventing possible short circuits, as well as preventing any potential combustible mixtures in the vicinity of engine 10 from coming into contact with wiring harness 16.

Having described the preferred embodiment, it will become apparent that various modifications can be made without departing from the scope of the invention as defined in the accompanying claims.

The invention claimed is:

1. A conduit enclosure system for enclosing an engine wiring harness having a manifold portion and a plurality of harness branches extending therefrom, said plurality of harness branches coupling a plurality of control components to a control unit, each control component of said plurality of control components having an exposed portion for electrical connection to said control unit via said engine wiring harness, said conduit enclosure system comprising:

a conduit manifold configured to removably enclose said manifold portion, said conduit manifold having a manifold outlet for each corresponding harness branch of said plurality of harness branches of said engine wiring harness;

a conduit branch for said each corresponding harness branch, said conduit branch being configured to removably lengthwise enclose said each corresponding harness branch, said conduit branch having a first branch end and a second branch end, said first branch end being coupled to a corresponding said manifold outlet, and said second branch end being coupled to said exposed portion of a corresponding control component of said plurality of control components in sealing engagement for sealing said exposed portion, said conduit branch being flexible and having threadlike convolutions to enable unscrewing from said conduit manifold.

2. The conduit enclosure system of claim 1, wherein conduit branch is at least partially collapsible.

3. The conduit enclosure system of claim 1, said engine wiring harness further having a harness trunk extending between said manifold portion and said control unit, further comprising a conduit trunk configured to removably lengthwise enclose said harness trunk, said conduit trunk having a first trunk end coupled to said conduit manifold in sealing engagement, said conduit trunk being flexible and having threadlike convolutions.

4. The conduit enclosure system of claim 3, said control unit residing in an enclosure, said conduit trunk having a second trunk end coupled to said enclosure in sealing engagement.

5. The conduit enclosure system of claim 3, further comprising an adapter configured to receive and connect and seal said conduit trunk with said conduit manifold.

6. The conduit enclosure system of claim 5, wherein said adapter is configured to removably connect to said conduit manifold.

7. The conduit enclosure system of claim 5, wherein said adapter is configured with a threadlike recess for removable engagement with said conduit trunk having threadlike convolutions.

8. The conduit enclosure system of claim 1, further comprising an adapter configured to receive and connect and seal said conduit branch with said manifold outlet for said each corresponding harness branch.

9. The conduit enclosure system of claim 8, wherein said adapter is configured to removably connect to said manifold outlet.

10. The conduit enclosure system of claim 9, wherein said adapter is configured with a threadlike recess for removable engagement with said conduit branch having threadlike convolutions.

11. The conduit enclosure system of claim 1, further comprising an adapter configured to connect and seal said conduit branch with said corresponding control component.

12. The conduit enclosure system of claim 11, further comprising a receptacle for receiving therein and sealing said exposed portion of said corresponding control component.

13. The conduit enclosure system of claim 11, wherein said corresponding control component is a conventional control component, further comprising a coupling device affixed to said conventional control component, said coupling device being configured for connection with said adapter.

14. The conduit enclosure system of claim 11, wherein said adapter is configured to removably connect to said corresponding control component.

15. The conduit enclosure system of claim 14, wherein said adapter is configured for removable engagement with said conduit branch.

16. An engine, comprising:
a control unit for controlling said engine;
a plurality of control components, each control component of said plurality of control components having an exposed portion for electrical connection with said control unit;
an engine wiring harness having a manifold portion and a plurality of harness branches extending therefrom, said plurality of harness branches electrically coupling said plurality of control components to said control unit via said exposed portion; and
a conduit enclosure system for enclosing said engine wiring harness, said conduit enclosure system including:
a conduit manifold configured to removably enclose said manifold portion, said conduit manifold having a manifold outlet for each corresponding harness branch of said plurality of harness branches of said engine wiring harness;
a conduit branch for said each corresponding harness branch, said conduit branch being configured to removably lengthwise enclose said each corresponding harness branch, said conduit branch having a first branch end and a second branch end, said first branch end being coupled to a corresponding said manifold outlet, and said second branch end being coupled to said exposed portion of a corresponding control component of said plurality of control components in sealing engagement for sealing said exposed portion, said conduit branch being flexible and having threadlike convolutions to enable unscrewing from said conduit manifold.

17. The engine of claim 16, wherein conduit branch is at least partially collapsible.

18. The engine of claim 16, said engine wiring harness further having a harness trunk extending between said manifold portion and said control unit, said conduit enclosure system further including a conduit trunk configured to removably lengthwise enclose said harness trunk, said conduit trunk having a first trunk end coupled to said conduit manifold in sealing engagement, said conduit trunk being flexible and having threadlike convolutions.

19. The engine of claim 18, said control unit residing in an enclosure, said conduit trunk having a second trunk end coupled to said enclosure in sealing engagement.

20. The engine of claim 18, said conduit enclosure system further including an adapter configured to connect and seal said conduit trunk with said conduit manifold.

21. The engine of claim 20, wherein said adapter is configured to removably connect to said conduit manifold.

22. The engine of claim 20, wherein said adapter is configured for removable engagement with said conduit trunk.

23. The engine of claim 16, said conduit enclosure system further including an adapter configured to connect and seal said conduit branch with said manifold outlet for said each corresponding harness branch.

24. The engine of claim 23, wherein said adapter is configured to removably connect to said manifold outlet.

25. The engine of claim 24, wherein said adapter is configured with a threadlike recess for removable engagement with said conduit branch having threadlike convolutions.

26. The engine of claim 16, said conduit enclosure system further including an adapter configured to connect and seal said conduit branch with said corresponding control component.

27. The engine of claim 26, said conduit enclosure system further including a receptacle for receiving therein and sealing said exposed portion of said corresponding control component.

28. The engine of claim 26, wherein said corresponding control component is a conventional control component, said conduit enclosure system further including a coupling device affixed to said conventional control component, said coupling device being configured for connection with said adapter.

29. The engine of claim 26, wherein said adapter is configured to removably connect to said corresponding control component.

30. The engine of claim 29, wherein said adapter is configured for removable engagement with said conduit branch.

* * * * *